(12) United States Patent
Nobori et al.

(10) Patent No.: US 11,530,748 B2
(45) Date of Patent: Dec. 20, 2022

(54) SEALING APPARATUS

(71) Applicants: Arai Seisakusho Co., Ltd., Tsukubamirai (JP); Keihin Corporation, Tokyo (JP)

(72) Inventors: Haruki Nobori, Tsukubamirai (JP); Yuya Suzuki, Tochigi (JP)

(73) Assignees: ARAI SEISAKUSHO CO, LTD., Tsukubamirai (JP); HITACHI ASTEMO, LTD., Hitachinaka-shi (JP)

( * ) Notice: Subject to any disclaimer, the term of this patent is extended or adjusted under 35 U.S.C. 154(b) by 452 days.

(21) Appl. No.: 16/705,369

(22) Filed: Dec. 6, 2019

(65) Prior Publication Data

US 2020/0232563 A1   Jul. 23, 2020

(30) Foreign Application Priority Data

Jan. 23, 2019  (JP) .............................. JP2019-009035

(51) Int. Cl.
  *F16J 15/16*   (2006.01)
  *F16J 15/46*   (2006.01)

(52) U.S. Cl.
  CPC ............ *F16J 15/166* (2013.01); *F16J 15/164* (2013.01); *F16J 15/46* (2013.01)

(58) Field of Classification Search
  CPC .......... F16J 15/021; F16J 15/022; F16J 15/06; F16J 15/064; F16J 15/10; F16J 15/104; F16J 15/164; F16J 15/166; F16J 15/3284
  See application file for complete search history.

(56) References Cited

U.S. PATENT DOCUMENTS

| | | | | |
|---|---|---|---|---|
| 2,494,598 A | * | 1/1950 | Waring | F16J 15/3208 277/455 |
| 2,705,177 A | * | 3/1955 | Waring | F16J 15/32 277/584 |
| 3,132,869 A | * | 5/1964 | Campbell | F16J 15/32 277/587 |
| 3,687,465 A | * | 8/1972 | Grime | F16J 15/028 277/910 |
| 3,767,215 A | * | 10/1973 | Brown | F41A 33/00 73/167 |
| 4,429,854 A | * | 2/1984 | Kar | E21B 10/25 277/377 |

(Continued)

FOREIGN PATENT DOCUMENTS

JP        3543617 B2    4/2004

*Primary Examiner* — Nicholas L Foster
(74) *Attorney, Agent, or Firm* — Bacon & Thomas, PLLC

(57) ABSTRACT

The shape of a back-up ring is a V-shaped sectional shape. In the back-up ring, an annular concave surface part having a V-shaped sectional shape serving as a valley toward a high-pressure side is formed on a surface part on a side that faces a seal ring, and an annular convex surface part having a V-shaped sectional shape serving as a peak toward a low-pressure side is formed on a surface part opposite to the side that faces the seal ring. When a high pressure is applied from a high-pressure side, the back-up ring is deformed such that V-shaped angles of an annular concave surface part and an annular convex surface part are increased as the annular concave surface part is pressed against the seal ring, and is brought into close contact with a housing and a shaft.

1 Claim, 6 Drawing Sheets

(56) References Cited

U.S. PATENT DOCUMENTS

| | | | | |
|---|---|---|---|---|
| 4,489,953 A * | 12/1984 | Witt | ...................... | F16J 15/166 277/584 |
| 6,131,913 A * | 10/2000 | Auber | .................. | F16J 15/3464 277/390 |
| 6,173,965 B1 * | 1/2001 | Niessen | ............... | F16J 15/3224 277/584 |
| 6,173,968 B1 * | 1/2001 | Nelson | .................. | F16J 15/166 277/584 |
| 6,267,382 B1 * | 7/2001 | Auber | ...................... | F16J 15/38 277/390 |
| 6,347,800 B1 * | 2/2002 | Auber | .................. | F16J 15/3464 277/400 |
| 6,386,545 B1 * | 5/2002 | Evans | ...................... | F16J 13/02 277/910 |
| 6,758,478 B1 * | 7/2004 | Moreno | ................ | B60T 8/3675 277/587 |
| 7,445,047 B2 * | 11/2008 | Gomez | .................. | E21B 34/14 277/342 |
| 7,942,425 B2 * | 5/2011 | Shojima | ............... | C09K 3/1009 277/914 |
| 8,794,638 B2 * | 8/2014 | Tuckness | ................. | F16J 15/26 277/584 |
| 9,206,665 B2 * | 12/2015 | Gerrard | .................. | E21B 33/10 |
| 9,243,713 B2 * | 1/2016 | Miura | .................... | F16J 15/166 |
| 9,458,691 B2 * | 10/2016 | Rowe | .................. | E21B 33/1212 |
| 9,777,839 B2 * | 10/2017 | Monma | .................. | F16J 15/166 |
| 9,845,878 B2 * | 12/2017 | Miura | .................... | F16J 15/166 |
| 10,890,256 B2 * | 1/2021 | Sawai | .................... | F16J 15/164 |
| 11,187,325 B2 * | 11/2021 | Yoshitsune | ............ | F16J 15/125 |
| 2002/0020967 A1 * | 2/2002 | Auber | .................. | F16J 15/3464 277/347 |
| 2002/0195739 A1 * | 12/2002 | Bagley | ............... | E21B 33/1216 528/125 |
| 2004/0135319 A1 * | 7/2004 | Moreno | ................ | B60T 8/3675 277/346 |
| 2005/0046187 A1 * | 3/2005 | Takeuchi | .............. | F16L 21/035 285/348 |
| 2006/0087085 A1 * | 4/2006 | Meller | .................. | F16J 15/166 277/616 |
| 2007/0089887 A1 * | 4/2007 | Gomez | .................. | E21B 34/14 166/334.4 |
| 2010/0019456 A1 * | 1/2010 | Gerrard | ................ | C01B 32/158 277/336 |
| 2013/0069321 A1 * | 3/2013 | Miura | .................... | F16J 15/166 277/638 |
| 2013/0069362 A1 * | 3/2013 | Miura | .................... | F16J 15/166 285/202 |
| 2014/0124193 A1 * | 5/2014 | Rowe | ...................... | E21B 33/10 166/115 |
| 2017/0097094 A1 * | 4/2017 | Monma | .................. | F16J 15/166 |
| 2017/0211703 A1 * | 7/2017 | Hatano | ................ | F16J 15/102 |
| 2018/0202554 A1 * | 7/2018 | Hogan | ...................... | F16J 12/00 |
| 2018/0372223 A1 * | 12/2018 | Yoshitsune | ............. | F16J 15/46 |
| 2021/0215253 A1 * | 7/2021 | Prate | ...................... | F16J 15/188 |

\* cited by examiner

SEALING APPARATUS

BACKGROUND OF THE INVENTION

Field of the Invention

The present invention relates to a high-pressure sealing apparatus used for, for example, a piping portion of an injector or the like, and particularly to a sealing apparatus including a seal ring and a back-up ring.

Background Art

In the related art, high-pressure sealing apparatus, including a seal ring composed of an O-ring made of a rubber elastic body and a back-up ring made of resin in order to seal a gap in, for example, a piping portion of an injector or the like, are disclosed.

An example thereof is illustrated in FIG. 4. For example, in an injector, an sealing apparatus 1 includes a seal ring 5 for sealing an annular gap D formed between an inner peripheral surface 21 of a housing 2 that is an outer member, and an outer peripheral surface 33 of a shaft 3 that is an inner member, and a back-up ring 6 that supports the seal ring 5. Both the seal ring 5 and the back-up ring 6 are mounted so as to be accommodated within an annular groove 4 formed in the outer peripheral surface of the shaft 3. Here, the seal ring 5 is disposed on a high-pressure side H where pressure is applied, and the back-up ring 6 is disposed on a low-pressure side L.

In this case, the seal ring 5 is an O-ring of a circular sectional shape made of a rubber elastic body, and the annular gap D is sealed between an inner peripheral surface 21 of the housing 2 and a side wall surface 31 of the annular groove 4 of the shaft 3. Meanwhile, the back-up ring 6 is generally made of resin of an oblong sectional shape, and supports the seal ring 5 so as to prevent protruding of the seal ring 5 to the annular gap D on the low-pressure side L.

In a sealing apparatus configured in this way, as illustrated in FIG. 5, when a high pressure P is applied from the high-pressure side H into the annular gap D, the seal ring 5 is elastically deformed so as to be strongly brought into close contact with the back-up ring 6. Here, the back-up ring 6 is originally provided to prevent the protruding of the seal ring 5. However, depending on usage conditions, for example, as illustrated in FIG. 5, a portion of the seal ring 5 protrudes to the low-pressure side L so as to be bitten by the annular gap D1 generated between the inner peripheral surface 21 of the housing 2 and an outer peripheral surface 62 of the back-up ring 6. Accordingly, there is a problem that the seal ring 5 is damaged and a sealing function thereof cannot be maintained.

Thus, in order to solve such a problem, Japanese Patent No. 3543617, as illustrated in FIG. 6, described a sealing apparatus in which the annular groove 4 has a tapered groove bottom part 34 that is inclined in a direction in which the spacing from the housing 2 becomes narrower from the side wall surface 31 toward the low-pressure side L, and the seal ring 5, and a back-up ring 7 having an inner peripheral wall surface 71 serving as a tapered part are provided in order from the high-pressure side H within the annular groove 4.

According to this invention, as the inner peripheral wall surface 71 of the back-up ring 7 abuts against the tapered groove bottom part 34 for pressure contact therewith due to an axial load to the low-pressure side L, and the diameter of the back-up ring 7 is increased radially outward due to a radial component force, an outer peripheral wall surface 72 is brought into close contact with an inner peripheral surface 21 of the housing 2. Accordingly, there is an effect that the protruding of the seal ring 5 to the low-pressure side L can be prevented.

SUMMARY OF THE INVENTION

However, even if the protruding of the seal ring 5 to the low-pressure side L is prevented by such an invention, when the back-up ring 7 is deformed with continuous load of the high pressure, there is a concern that a portion of the back-up ring 7 may protrude to the annular gap D between the inner peripheral surface 21 of the housing 2 and the outer peripheral surface 33 of the shaft 3 and may be damaged.

The invention has been made in order to solve such problems, and an object thereof is to provide a sealing apparatus capable of preventing both protruding of a seal ring and protruding of a back-up ring at the application of a high pressure.

In order to achieve such an object, the invention provides a high-pressure sealing apparatus that is mounted on an annular groove provided in at least one of two members of an outer member and an inner member to seal an annular gap between the two members. The sealing apparatus includes a seal ring that is mounted on a high-pressure side within the annular groove; and a back-up ring that is mounted closer to a low-pressure side than the seal ring within the annular groove and is made of a material harder than the seal ring. In the back-up ring, an annular concave surface part having a V-shaped sectional shape serving as a valley toward the high-pressure side is formed on a surface part on a side that faces the seal ring, and an annular convex surface part having a V-shaped sectional shape serving as a peak toward the low-pressure side is formed on a surface part opposite to the side that faces the seal ring. With a high pressure being applied from the high-pressure side, the back-up ring is deformed such that V-shaped angles of the annular concave surface part and the annular convex surface part are increased as the annular concave surface part is pressed against the seal ring, and is brought into close contact with the outer member and the inner member.

In the sealing apparatus of the invention, when a high pressure is applied, the back-up ring is deformed and brought into the outer member and the inner member such that the V-shaped angles of the annular concave surface part and the annular convex surface part are increased, and thereby protruding of the seal ring is prevented. Moreover, in the invention, the surface of the back-up ring opposite to the side that faces the seal ring is formed as the V-shaped annular convex surface part. Accordingly, even in a state where the high pressure is applied and the back-up ring is deformed, the back-up ring does not reach the annular gap on the low-pressure side. Thus, the protruding of the back-up ring is also prevented.

DETAILED DESCRIPTION OF THE INVENTION

Hereinafter, a sealing apparatus according to an embodiment of the invention will be described with reference to the accompanying drawings. In addition, the same components as those of the present embodiment and the related art will be designated by the same reference signs, and the description thereof will be appropriately omitted. Additionally, the present embodiment is merely one embodiment of the invention, is not interpreted to be limited to this at all, and can be changed in design within the scope of the invention.

Figure 1:
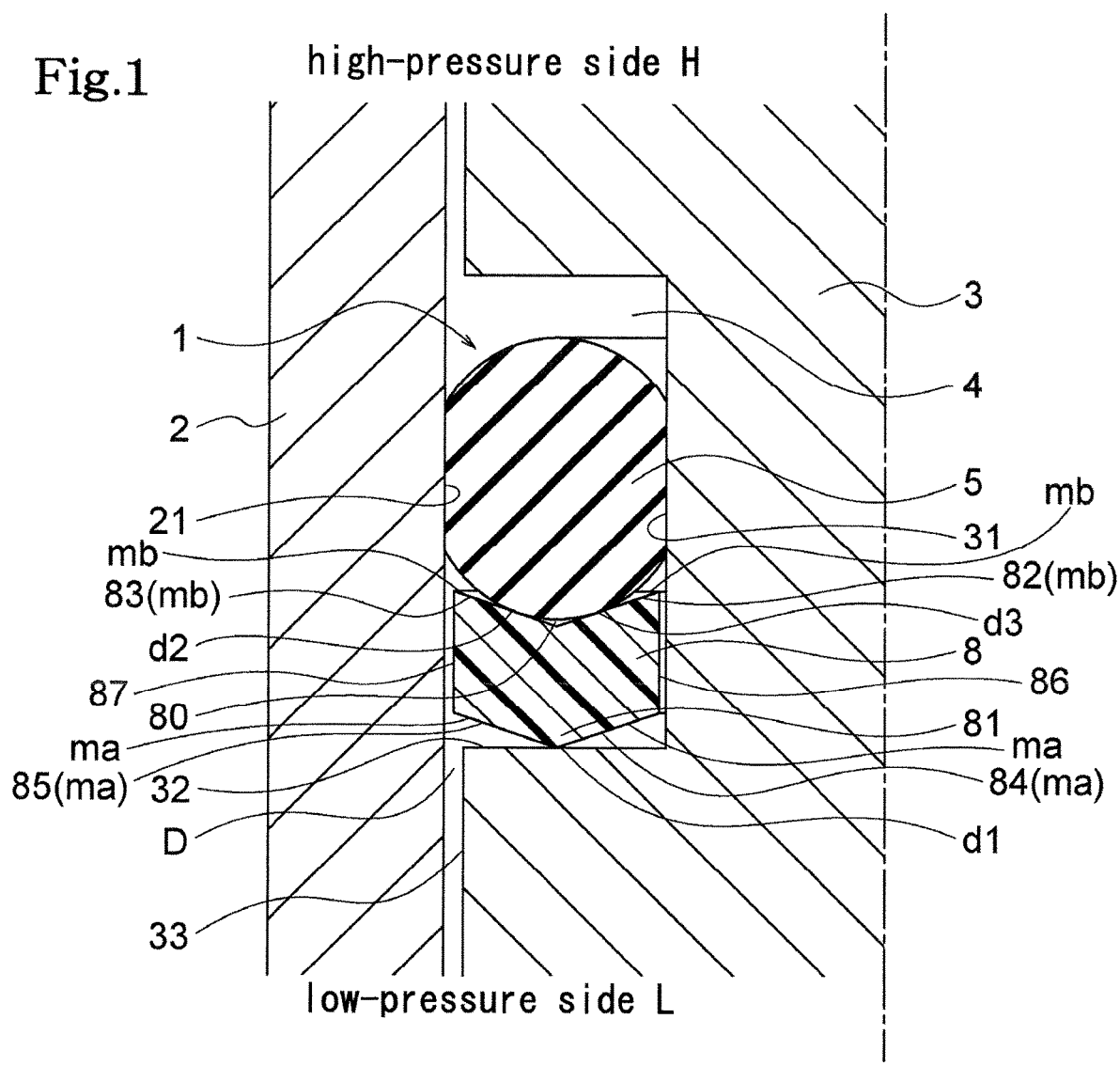
FIG. 1 is a sectional view of essential parts illustrating a state where no pressure is applied to a sealing apparatus according to an embodiment of the invention.

The sealing apparatus 1 of the present embodiment, as illustrated in FIG. 1, is mounted on an annular groove 4, which is provided in a shaft 3 that is one of two members including a housing 2 that is an outer member and the shaft 3 that is an inner member, to seal an annular gap D between the two members of the housing 2 and the shaft 3. The sealing apparatus 1 is configured to include a seal ring 5 disposed on a high-pressure side H of the annular groove 4, and a back-up ring 8 disposed adjacent to the seal ring 5 on a low-pressure side L so as to support the seal ring 5.

The annular groove 4 provided in the shaft 3 of the sealing apparatus 1 of the present embodiment, is formed in a concave shape recessed in an oblong shape toward a shaft center on an outer peripheral surface 33 of the shaft 3 that faces an inner peripheral surface 21 of the housing 2, and the seal ring 5 and a back-up ring 8 is mounted so as to be accommodated within the annular groove 4 to constitute a sealing unit. In addition, in the present embodiment, an example in which the annular groove 4 on which the seal ring 5 and the back-up ring 8 are mounted is formed on the shaft 3 side is shown. However, the annular groove 4 may be formed on the housing 2 side, or may have a structure in which the annular grooves 4 are formed on both the housing 2 side and the shaft 3 side.

Figure 2:
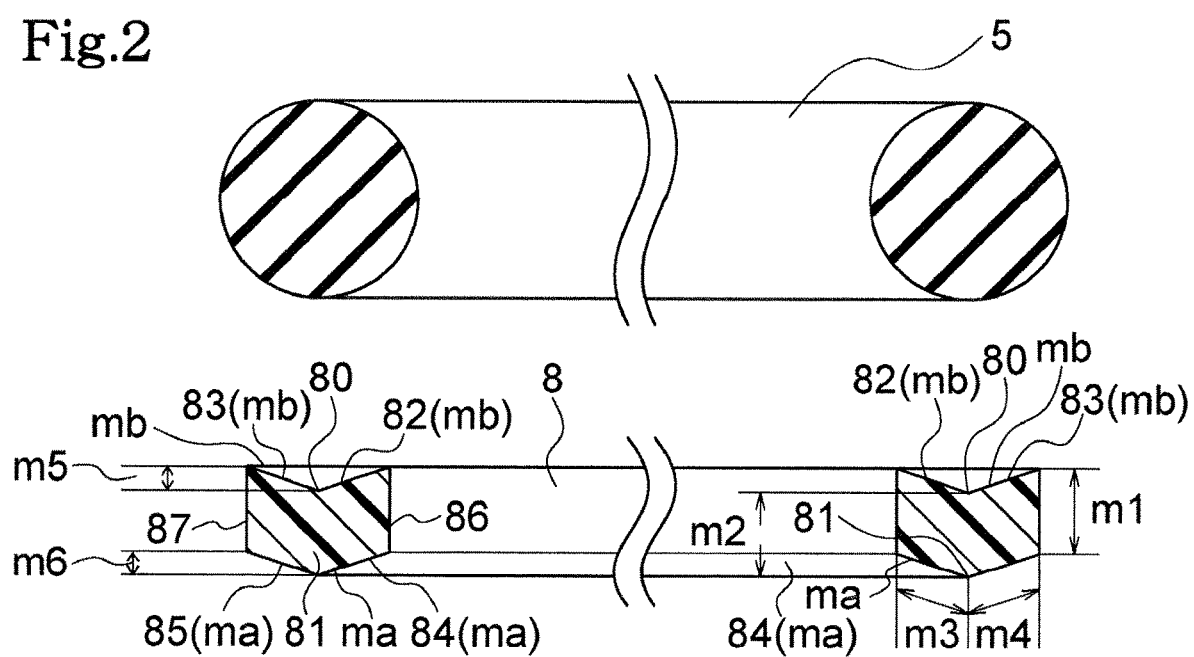
FIG. 2 is a sectional view of essential parts of a seal ring and a back-up ring of the sealing apparatus according to the embodiment of the invention.

The seal ring 5 constituting the sealing apparatus 1 of the present embodiment, as illustrated in FIG. 2, is a so-called O-ring that is a rubber elastic material having a circular section in an axial direction in a state where elastic deformation resulting from pressure does not occur. The seal ring 5 is formed such that the internal diameter thereof is smaller than the external diameter of a side wall surface 31 within the annular groove 4 in the shaft 3 and the external diameter thereof is larger than the internal diameter of the inner peripheral surface 21 of the housing 2. Therefore, in the mounting state of the seal ring 5, as illustrated in FIG. 1, the seal ring 5 seals the annular gap D by being elastically deformed so as to be brought into close contact with the side wall surface 31 of the annular groove 4 of the shaft 3 on an internal diameter side thereof and be brought into close contact with the inner peripheral surface 21 of the housing 2 on an external diameter side thereof.

Figure 3:
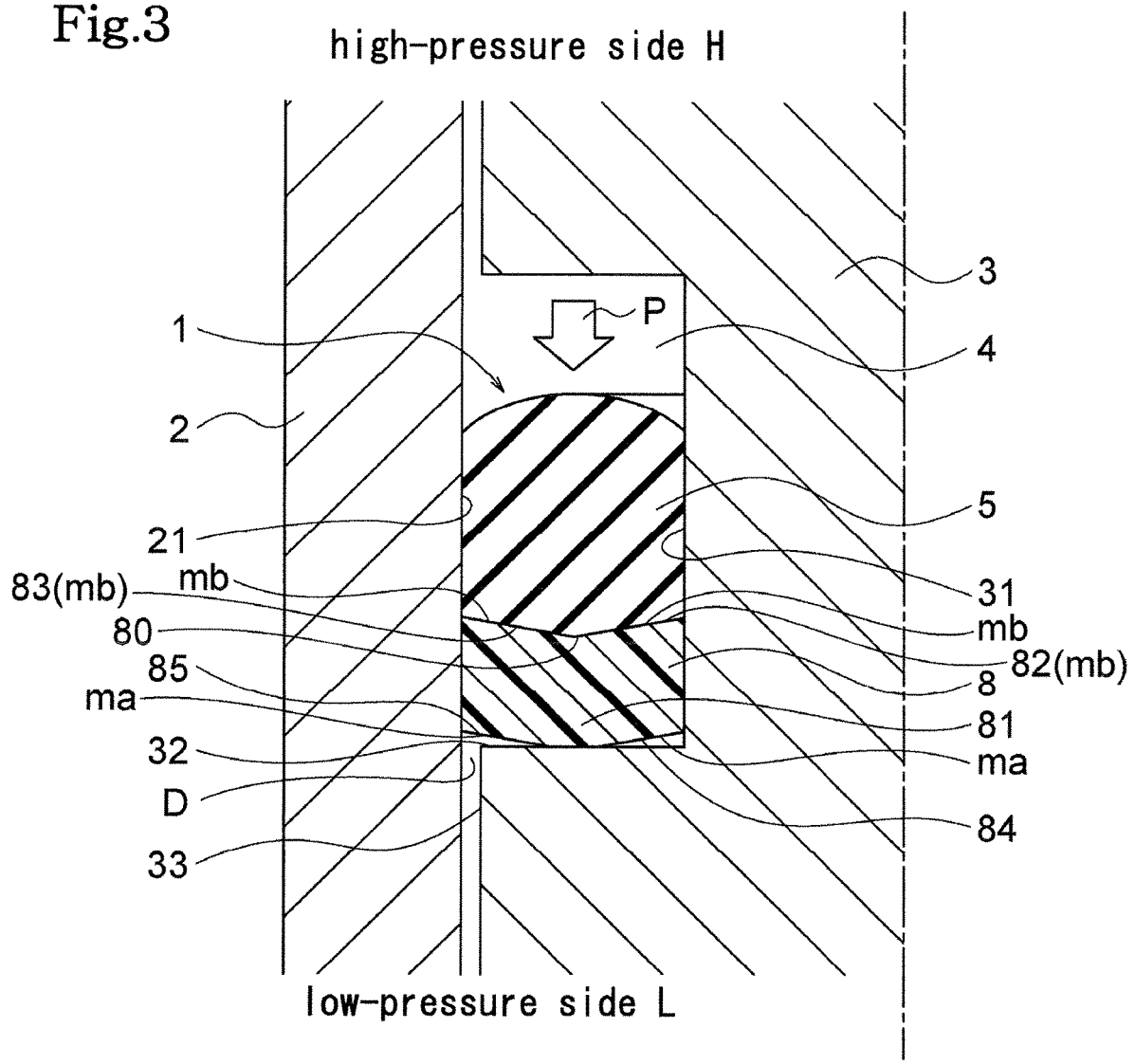
FIG. 3 is a sectional view of essential parts illustrating a state where pressure is applied to the sealing apparatus according to the embodiment of the invention.
Figure 4:
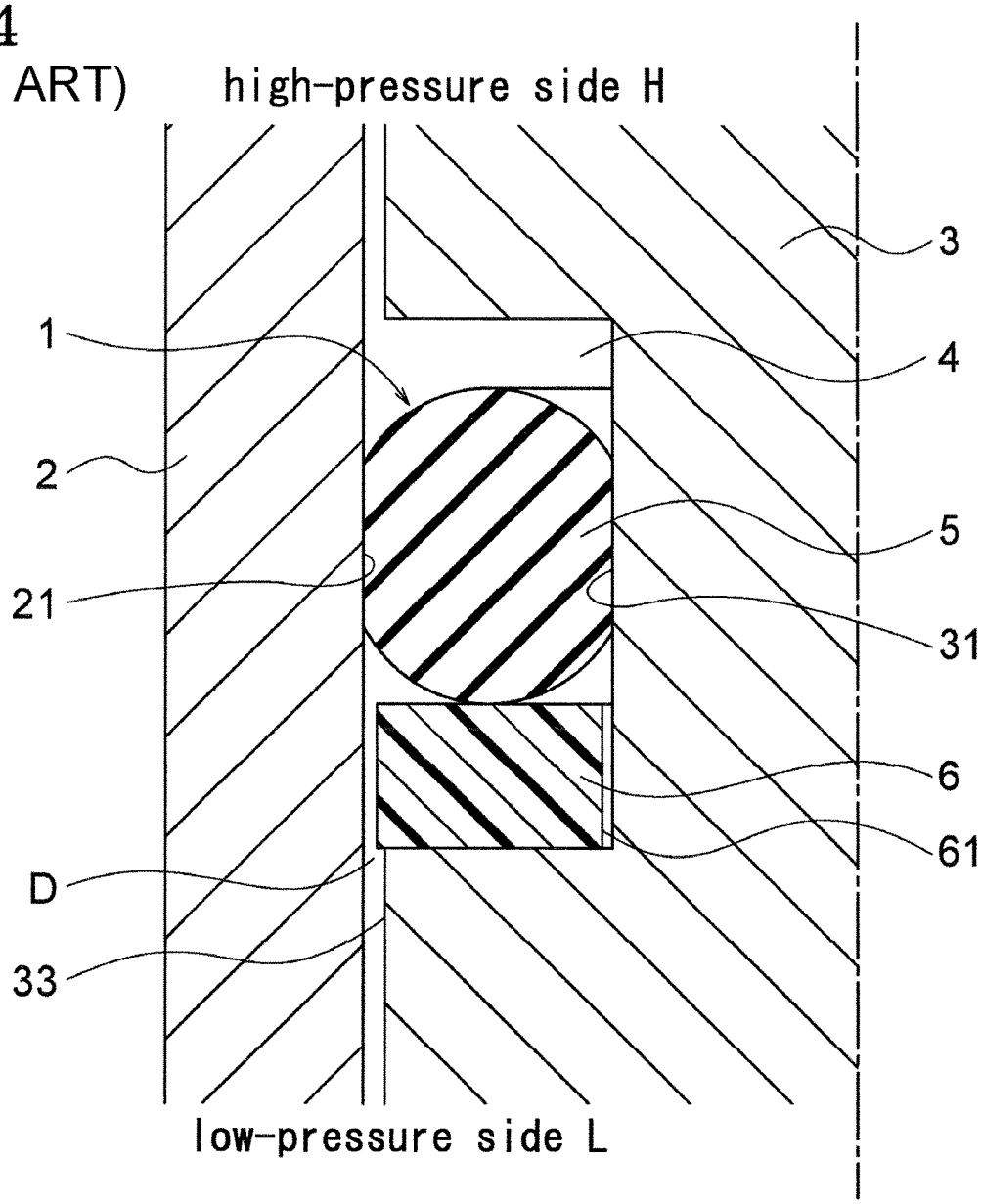
FIG. 4 is a sectional view of essential parts illustrating a state where no pressure is applied to a sealing apparatus according to the related art.
Figure 5:
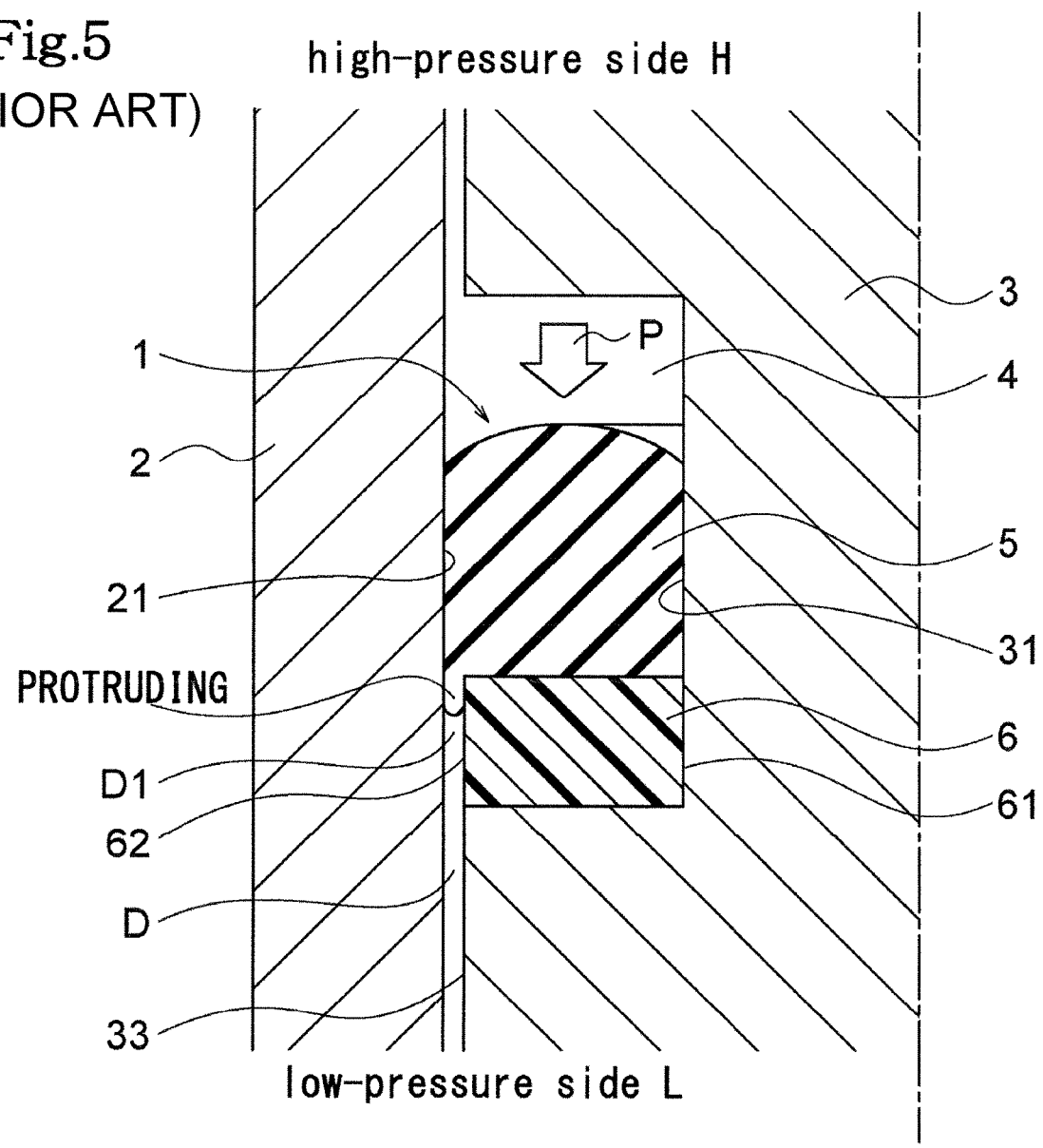
FIG. 5 is a sectional view of essential parts illustrating a state where pressure is applied to the sealing apparatus according to the related art.
Figure 6:
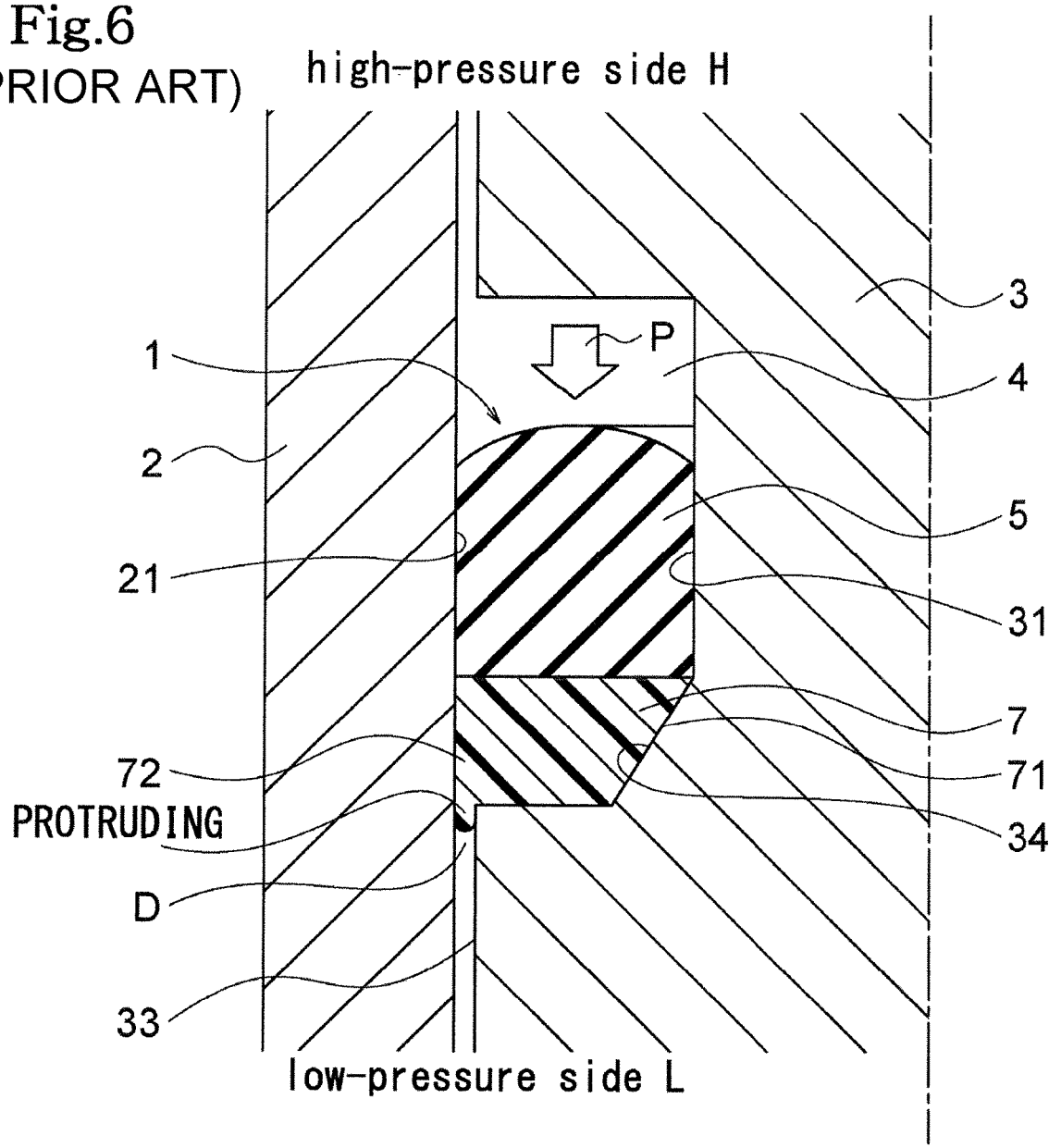
FIG. 6 is a sectional view of essential parts illustrating a state where pressure is applied to another sealing apparatus according to the related art.

Then, when a high pressure P is applied from the high-pressure side H to the low-pressure side L, as illustrated in FIG. 3, the seal ring 5 is elastically deformed so as to be brought into close contact with the back-up ring 8 without a gap. In this state, the seal ring 5 is brought into close contact with the inner peripheral surface 21 of the housing 2 and the side wall surface 31 of the annular groove 4 in a range larger than in an initial state (FIG. 1), and thereby, an annular space D is more reliably sealed, and the sealability capable of withstanding the high pressure P is secured.

Additionally, an O-ring serving as the seal ring 5 is a general elastic body made of rubber, and for example, fluororubber is preferably used as a material of the seal ring. In addition to this, various rubber materials, such as nitrile rubber, hydrogenated nitrile rubber, ethylene propylene rubber, silicone rubber, and acrylic rubber, are available.

The back-up ring 8 is made of a material (having high hardness) harder than the seal ring 5, and is formed such that the sectional shape thereof is a V shape. That is, in the back-up ring 8, an annular concave surface part mb having a V-shaped sectional shape serving as a valley (valley part 80) toward the high-pressure side H is formed on a surface part on a side that faces the seal ring 5, and an annular convex surface part ma having a V-shaped sectional shape serving as a peak (protruding part 81) toward the low-pressure side L is formed on a surface part opposite to the side that faces the seal ring 5.

Then, two parallelograms in which an inclined surface on the high-pressure side H and an inclined surface on the low-pressure side L are parallel to each other are combined together to form a shape that becomes a peak and a valley. Specifically, in the sectional shape of the back-up ring 8 of FIG. 2, the annular concave surface part mb is composed of an inner top inclined surface 82 and an outer top inclined surface 83 on the high-pressure side H, and the annular convex surface part ma is composed of an inner bottom inclined surface 84 and an outer bottom inclined surface 85 on the low-pressure side L. Additionally, the outer top inclined surface 83 on the high-pressure side H and the outer bottom inclined surface 85 on the low-pressure side L are parallel to each other, and the inner top inclined surface 82 on the high-pressure side H and the inner bottom inclined surface 84 on the low-pressure side L are parallel to each other. That is, in the back-up ring 8, the thickness of the outer peripheral surface 87 and the thickness of the inner peripheral surface 86 are the same length with a dimension m1, the thicknesses of the protruding part 81 and the valley part 80 are the same length with a dimension m2, the inner top inclined surface 82 on the internal diameter side and the inner bottom inclined surface 84 on the internal diameter side have the same length and inclination with a dimension m3, and the outer top inclined surface 83 on the external diameter side and the outer bottom inclined surface 85 on the external diameter side have the same length and inclination with a dimension m4. Additionally, a depth dimension m5 in an axial direction between end parts of the inner top inclined surface 82 and the outer top inclined surface 83 and the bottom of the valley part 80 is the same length as a height dimension m6 in the axial direction between radial end parts of the inner bottom inclined surface 84 and the outer bottom inclined surface 85 and the protruding part 81.

As a material used for the back-up ring 8, PTFE (polytetrafluoroethylene) is preferably used. In addition to this, various resin materials, such as perfluoroalkoxyalkane (PFA), ethylenetetrafluethylene (ETFE), polyvinyl chloride (PVC), polypropylene (PP), polyoxymethylene (POM), polyethylene terephthalate (PET), ABS resin, and acrylic resin, are available, and these are appropriately selected and used depending on conditions (pressure and temperature) in use.

Next, in the present embodiment, the state of the back-up ring 8 before and after the high pressure P is applied to the seal ring 5 will be described. As illustrated in FIG. 1, a V-shaped angle used as the valley of the annular concave surface part mb of the back-up ring 8 and a V-shaped angle serving as the peak of the annular convex surface part ma are obtuse angles of approximately 140 degrees in a state where no high pressure is applied to the sealing apparatus 1. In this state, the outer peripheral surface 87 and the inner peripheral surface 86 of the back-up ring 8 are not brought into close contact with the inner peripheral surface 21 of the housing 2 and the side wall surface 31 of the annular groove 4 of the shaft 3, respectively.

In addition, even if the V-shaped angle serving as the valley of the annular concave surface part mb and the V-shaped angle serving as the peak of the annular convex surface part mb is not the same, the V-shaped sectional shape is within the scope of the invention. Additionally, even if the thicknesses on the external diameter side and the internal diameter side of the back-up ring 8 are different from each other, the V-shaped sectional shape is within the scope of the invention.

Additionally, the annular concave surface part mb of the back-up ring 8 adjacent to the seal ring 5 has a V-shaped valley shape in a state where no high pressure is applied. Therefore, the seal ring 5 and the back-up ring 8 abuts against each other at two points of contact points d2 and d3. On the other hand, the protruding part 81 of the annular convex surface part ma of the back-up ring 8 directed to the low-pressure side L and an outer peripheral bottom surface 32 of the annular groove 4 of the shaft 3 abuts against each other at one point of the contact point d1.

When the high pressure P is applied to the sealing apparatus 1, as illustrated in FIG. 3, the back-up ring 8 is deformed such that the V-shaped angles of the annular concave surface part mb and the annular convex surface part ma are increased with the protruding part 81 as a fulcrum as the annular concave surface part mb is pressed against the seal ring 5. In the present embodiment, the V-shaped angles of the annular concave surface part mb of the back-up ring 8 and the V-shaped angle of the annular convex surface part ma are increased so as to be obtuse angles of approximately 160 degrees. Accordingly, the outer peripheral surface 87 of the back-up ring 8 is brought into close contact with the inner peripheral surface 21 of the housing 2 without a gap, and the inner peripheral surface 86 of the back-up ring 8 is brought into close contact with the side wall surface 31 of the annular groove 4 of the shaft 3 without a gap.

In this state, the seal ring 5 is elastically deformed due to the high pressure P, and is wholly in close with the annular concave surface part mb of the back-up ring 8. However, here, as the back-up ring 8 is brought into close contact with the inner peripheral surface 21 of the housing 2 and the side wall surface 31 of the annular groove 4 of the shaft 3 without a gap as described above, this acts to suppress protruding of the seal ring 5 to the low-pressure side L, and thereby, the protruding of the seal ring 5 is effectively prevented.

Moreover, in the sealing apparatus 1, the surface of the back-up ring 8 opposite to the side that faces the seal ring 5 is formed as the V-shaped annular convex surface part ma. Accordingly, even in a state where the high pressure P is applied and the back-up ring 8 is deformed, the back-up ring 8 does not reach the annular gap D on the low-pressure side L. For this reason, the protruding of the back-up ring 8 is also effectively prevented.

Here, particularly, viewing the annular convex surface part ma of the back-up ring 8, the annular convex surface part ma maintains the V shape although the V-shaped angle is wider than that in the initial state in a state where the high pressure P is applied and the back-up ring 8 is brought into close contact with the inner peripheral surface 21 of the housing 2 and the side wall surface 31 of the annular groove 4 of the shaft 3.

Therefore, the back-up ring 8 is held in a state where the back-up ring is accommodated in the annular groove 4, and does not reach the annular gap D on the low-pressure side L. Thus, the protruding of the back-up ring 8 is more reliably prevented.

In this way, in the sealing apparatus 1 of the present embodiment, both the protruding of the seal ring 5 and the protruding of the back-up ring 8 at the application of a high pressure can be prevented. Thus, a sufficient sealing function can be maintained, and thereby, a sealing apparatus with high reliability can be provided.

INDUSTRIAL APPLICABILITY

The invention is not limited to the high-pressure sealing apparatus used for a piping portion of an injector or the like, and is also available as high-pressure sealing apparatus that seal annular gaps of pressure sensor apparatus used for general machines or the like.

EXPLANATION OF REFERENCES

1: sealing apparatus
2: housing (outer member)
3: shaft (inner member)
4: annular groove
5: seal ring
8: back-up ring
D: annular gap
ma: annular convex surface part
mb: annular concave surface part
P: high pressure

What is claimed is:
1. A high-pressure sealing apparatus that is mounted on an annular groove provided in at least one of two members of an outer member and an inner member to seal an annular gap between the two members, the sealing apparatus comprising:
  a seal ring that is mounted on a high-pressure side within the annular groove; and
  a back-up ring that is mounted closer to a low-pressure side than the seal ring within the annular groove and is made of a material harder than the seal ring,
  wherein, in the back-up ring, an annular concave surface part having a V-shaped sectional shape serving as a valley toward the high-pressure side is formed on a surface part on a side that faces the seal ring, and an annular convex surface part having a V-shaped sectional shape having a peak portion protruding toward the low-pressure side is formed on a surface part opposite to the side that faces the seal ring, only the peak portion of the annular convex surface part is in contact with the annular groove,
  wherein, with a high pressure being applied from the high-pressure side, the back-up ring is deformed such that V-shaped angles of the annular concave surface part and the annular convex surface part are increased as the annular concave surface part is pressed against the seal ring as a fulcrum at the peak portion of the annular convex surface part, and is brought into close contact with the outer member and the inner member, and wherein the annular convex surface part maintains a V shape in the close contact state.

* * * * *